United States Patent [19]

Green

[11] Patent Number: 5,511,763
[45] Date of Patent: Apr. 30, 1996

[54] FOOT OPERATED STOP VALVE

[76] Inventor: Ronald D. Green, 1719 Zinnia La., San Jose, Calif. 95124

[21] Appl. No.: 269,891

[22] Filed: Jul. 1, 1994

[51] Int. Cl.$^6$ .......................... F16K 31/02; F16K 31/62; G05G 1/14
[52] U.S. Cl. .............................. 251/129.02; 251/129.04; 251/294; 251/295; 251/322; 251/324; 4/624; 74/156; 74/512; 74/560
[58] Field of Search ......................... 251/129.02, 129.04, 251/294, 295, 322, 324; 4/624; 74/106, 512, 560

[56] References Cited

U.S. PATENT DOCUMENTS

| | | |
|---|---|---|
| 647,144 | 4/1900 | Mercer ........................................ 74/106 |
| 1,093,452 | 4/1914 | Metcalf ................................ 251/295 X |
| 1,176,784 | 3/1916 | Speiden .............................. 251/295 X |
| 1,212,085 | 1/1917 | Metcalf ................................ 251/295 X |
| 1,474,996 | 11/1923 | Carson ..................................... 74/106 |
| 1,627,020 | 5/1927 | Dougherty ........................... 251/295 X |
| 1,848,456 | 3/1932 | Beebe .................................. 251/295 X |
| 2,549,537 | 4/1951 | Sokolik ................................... 251/295 |
| 2,830,618 | 4/1958 | Mitchell ................................. 137/599 |
| 2,946,485 | 7/1960 | Durner ................................. 251/324 X |
| 3,019,810 | 2/1962 | Aymar et al. ........................... 137/495 |
| 3,536,294 | 10/1970 | Rodriguez ................................ 251/41 |
| 3,594,828 | 7/1971 | Seck ........................................ 251/294 |
| 5,029,806 | 7/1991 | Huo-Lien et al. ........................ 251/14 |
| 5,095,941 | 3/1992 | Betz ......................................... 137/552 |
| 5,125,623 | 6/1992 | Kiedinger ................................ 251/295 |
| 5,199,119 | 4/1993 | Weber ......................................... 4/619 |
| 5,230,365 | 7/1993 | Woltz et al. ............................. 137/607 |

FOREIGN PATENT DOCUMENTS

| | | | |
|---|---|---|---|
| 47702 | 7/1909 | France ................................... 251/294 |
| 1469226 | 3/1989 | U.S.S.R. .................................. 74/106 |

OTHER PUBLICATIONS

Kitchen Aerator, *Seventh Generation:Products for a Healthy Planet*, Summer 1994.

Chrome Shower, *Seventh Generation:Products for a Healthy Planet*, Summer 1994.

Primary Examiner—John Rivell
Attorney, Agent, or Firm—James J. Leary

[57] ABSTRACT

A water saving device, implemented as a pair of spring loaded, normally-open shutoff valves inserted into the hot and cold water supply lines of a faucet, which are connected via a cable mechanism to a foot actuator. Actuating the mechanism causes the shutoff valves to close, interrupting any flow of water in the supply lines. Releasing the mechanism allows flow to resume. The shutoff valves are installed in series upstream of the normal hand-operated faucet valves. The user starts the water flow and adjusts the temperature of the water in the normal manner using the hand-operated faucet valves. When the user wishes to temporarily stop the water flow he or she steps on the foot pedal, thereby causing the shutoff valves to close. When the pedal is released the shutoff valves open and the water flow resumes at the same flow rate and temperature previously set by the user.

19 Claims, 4 Drawing Sheets

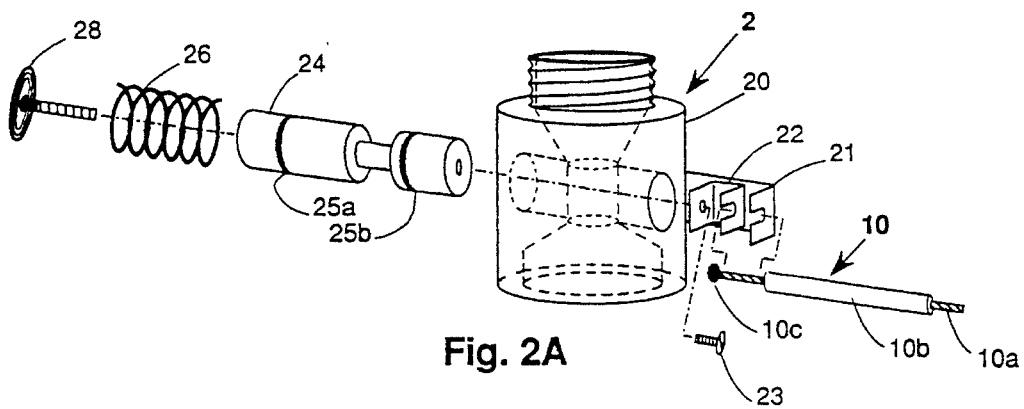
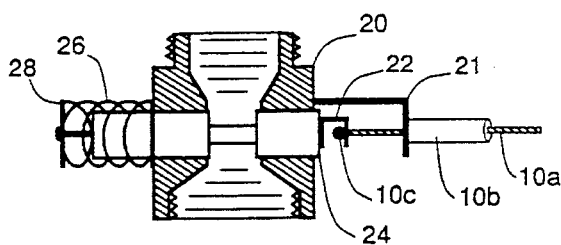 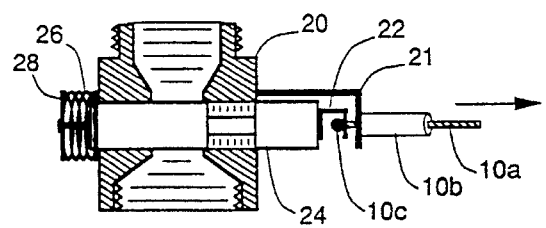
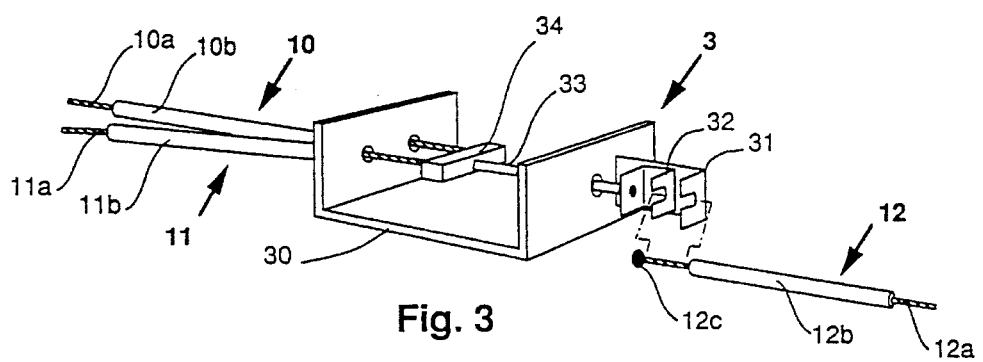

FOOT OPERATED STOP VALVE

BACKGROUND—FIELD OF INVENTION

This invention relates to water valves, specifically to foot operated valves.

BACKGROUND—DESCRIPTION OF PRIOR ART

The foot pedal for water control is a well developed field. These devices are employed in many medical facilities, industrial settings, public restrooms and installations for the handicapped. Patent research reveals no less than 14 U.S. Pats. in this field, dating from 1914 to 1993. These and similar devices have been offered to address the various objectives of water conservation, improved sanitation, and convenience of use.

The central purpose of the present invention is water conservation, therefore the discussion of prior art will be considered in that light. The specific objective here, is to create a water saving device that is conducive to installation and use with sinks in the home. To achieve this objective, the device must:

(a) retrofit easily;

(b) be attractive enough to be accepted in a home environment;

(c) be inexpensive; and, (d) offer a unique new convenience.

The ability to retrofit easily is critical. A device that cannot easily retrofit will not achieve much penetration in the existing home market. The best configuration for retrofit is one in which the existing faucet and fixtures are not affected. This would hold to a minimum, the cost and complexity of installing a new device.

There are several examples of prior art that are poor candidates for retrofit: U.S. Pat. No. 3,638,680 to Kopp (1972), and U.S. Pat. No. 5,095,941 to Betz (1992) both claim foot controlled devices that require replacement of the existing faucet and need a source to power electronics; U.S. Pat. No. 5,125,623 (1992) to Kiedinger requires a difficult modification to the existing faucet; and, U.S. Pat. No. 5,199,119 (1993) to Weber requires replacement of the existing faucet.

For a device to be accepted into the home, it must be attractive, unobtrusive, and not introduce too much new paraphernalia. These examples illustrate another problem: U.S. Pat. No. 3,536,294 (1970) to Rodriguez, and U.S. Pat. No. 5,029,806 (1991) to Chuang both introduce hoses running between a foot pedal and a sink faucet. In most cases, such a hose would have to be installed in a manner that would leave it in full view, which would make this type of device esthetically less appealing.

The following example satisfies both criteria of easy and attractive retrofit: U.S. Pat. No. 5,230,365 to Woltz et al, (1993). However, this device inserts a normally-closed valve in series with both the hot and cold water supply lines. This design requires that the existing faucet be turned on before water can be dispensed with the foot pedal. Since hand operation is required anyway, the foot pedal becomes redundant, and is not particularly advantageous.

Further review of previously referenced Pat. numbers reveals that all of these devices are water dispensing mechanisms. Although foot controlled dispensing devices offer advantages in medical settings, or with the handicapped, there is no compelling reason to install them in the home. The reason is that manual dispensing is already simple, convenient, and straightforward. Moreover, the hands are more agile and precise than the feet, making it quicker and easier to accomplish this task with the hands. More still, the problem of mixing hot and cold to attain the desired temperature is simple as a manual task. Precise foot control of temperature, however, requires a more sophisticated foot device, such as a split pedal. In some other devices, temperature control requires manual intervention, such as setting a thermostat in an electrically controlled system. The need for manual intervention diminishes some of the original reasons for installing a foot pedal.

Whereas the prior art focuses on water dispensing, the present invention is a water suspending device. The essential difference in these two approaches is with regard to their use model. In this case, "use model" means the way or method by which something is used or employed (e.g., the technique and motions for using a saw to cut wood, are different compared to using an axe.)

Specifically, the use model for suspending water is the inverse of the use model for dispensing. That is, actuating the mechanism stops flow as opposed to starting it. There are several advantages to this approach, which will be detailed in the following discussion. More importantly, it appears that this approach has been completely overlooked in the prior art.

OBJECTS AND ADVANTAGES

Accordingly, the objects and advantages of the present invention are:

(a) to provide a water saving device that is easily retrofitted;

(b) for that device to be simple and inexpensive;

(c) provide an attractive installation; and, (d) offer a use model that is convenient in a unique, new way.

The current invention is a device that allows a person to use a foot pedal to suspend water flowing at a sink. The important distinction here is the choice of an "off" valve, rather than the "on" valve used in all foot controlled water dispensing devices. This approach actually leverages the fact that the existing valves will be used as they normally are: to dispense water, and to set its temperature and flow. This implementation offers several advantages: the components can be simple and inexpensive; the device can be made to retrofit easily; and the plumbing connection can remain out of view under a sink in its vanity cabinet. More importantly, the device has a use model which is superior in many ways: it introduces no redundant elements; there is no need for precise control over temperature or flow; and, in fact, it is more conducive to use where conservation is the objective.

In particular, this last point is key. There are many occasions when water is turned on and run for a period of time; washing dishes, shaving, or brushing teeth, for example. Often while performing these tasks, there are times when water goes unused. Yet the hands are busy, and the additional task of turning the water on and off represents extra steps.

Prior art has offered foot controlled dispensing to address this problem. Yet considering that existing fixtures already perform dispensing, the problem is better approached from the reverse: that is, the water can be turned off when it is not needed. This approach has the affect of complementing the existing faucet, rather than trying to duplicate or replace its function.

The greatest majority of existing faucets are manually operated, therefore this is the "expected" use model. The hands and feet may both be available to start the flow of water, but because it is natural and convenient to use the hands there is no compelling reason to use the feet. However, once water is flowing and the hands are occupied, the feet have the advantage of being available, and can be used to suspend flow, creating a new convenience.

This device is an implementation based on a contrary approach, which has been entirely missed in the prior art. By taking this approach, the current invention offers a superior use model, which creates a wholly new and unexpected result.

A consideration of the included descriptions and drawings will further clarify the objects and advantages of this invention.

SUMMARY

The basic elements of the current invention will be readily understood by those with normal skill in the art. The novel aspect of the this invention is its focus on the use model for suspending water flow, which is a departure from the prior art.

The current invention is rendered two ways: one consists of an all mechanical implementation, the other utilizes electrical components.

The first implementation consists of two spring loaded, normally-open shutoff valves inserted one each into the hot and cold supply lines to a sink faucet. In turn, these valves are connected via a cable mechanism to a foot pedal on the floor. Depressing the foot pedal closes both valves, suspending the flow of water to the faucet. Releasing the foot pedal opens both valves, resuming water flow.

The second implementation consists of two electric solenoid valves inserted one each into the hot and cold supply lines to a sink faucet. These valves are configured to be normally open: closing when power is applied and opening when power is removed. The solenoid valves are wired in parallel, and are connected to a power supply via a switch. When the switch is closed, the circuit is completed, causing the valves to close. When the switch is released, the circuit is broken, allowing the valves to open.

This invention has the advantages that: it is a simple device; it is easy to retrofit; it is attractive to retrofit; and, compared to water dispensing devices, it has a superior use model where water conservation is the main concern.

BRIEF DESCRIPTION OF THE DRAWINGS

This series of drawings illustrates the present invention in detail. Closely related figures have the same number but different suffix characters.

FIG. 2A is an exploded view of the shutoff valve assembly.

FIG. 2B is a cut away view of the shutoff valve depicting the nominal position, which is open.

FIG. 2C is a cut away view of the shutoff valve depicting the actuated position, which is closed.

FIG. 3 is a perspective of the cable junction box assembly.

Figure 1:
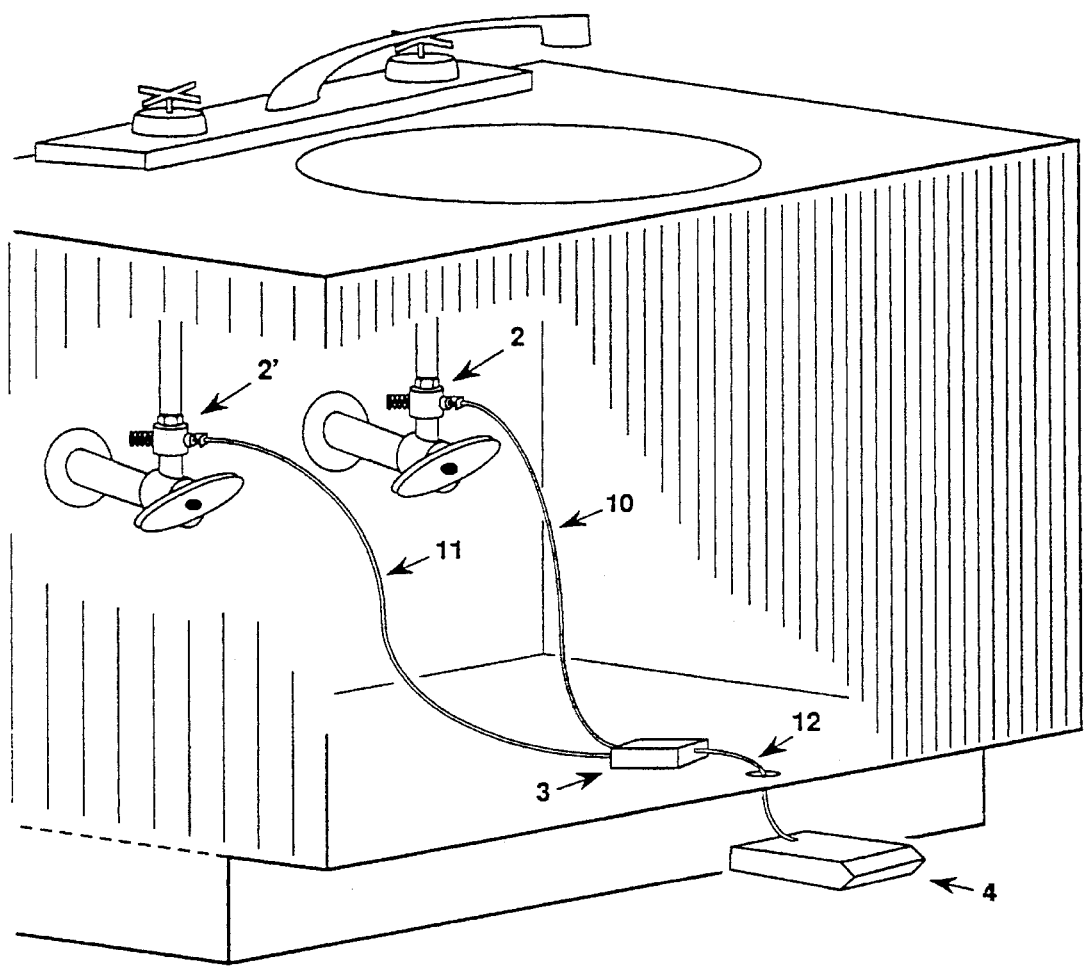
FIG. 1 is a perspective view of the present invention installed in a typical sink vanity cabinet.

LIST OF REFERENCE NUMERALS ASSOCIATED WITH FIRST EMBODIMENT 2 shutoff valve assembly inserted into cold water supply line
2' shutoff valve assembly inserted into hot water supply line
3 cable junction box assembly
4 foot pedal assembly
10 cable assembly between cold water shutoff valve and junction box
10a cable core
10b cable outer jacket
10c cable end ball
11 cable assembly between hot water shutoff valve and junction box
11a cable core
11b cable outer jacket
12 cable assembly between junction box and foot pedal
12a cable core
12b cable outer jacket
12c cable end ball
20 body of shutoff valve
21 cable sleeve slotted support bracket
22 cable end slotted hook bracket
23 screw
24 sliding plunger
25a & b gasket seals
26 compression spring
28 spring end cap with screw
30 frame of cable junction box
31 cable sleeve slotted support bracket
32 cable end slotted hook bracket
33 hooked bracket to joining member link rod
34 cable joining member
40 base frame of foot pedal
42 hinged pedal plate
44 foot pedal rear hinge
46a–f articulated members of six-sided hinge
47 hinge pin
48 cable holder sleeve

LIST OF REFERENCE NUMERALS ASSOCIATED WITH SECOND EMBODIMENT 7 electric solenoid shutoff valve inserted into the cold water supply line
7' electric solenoid shutoff valve inserted into the hot water supply line
8 electric junction box
9 electric switch of type single pole, single throw
50 twin conductor wire from cold water solenoid valve
51 twin conductor wire from hot water solenoid valve
52 twin conductor wire from electric switch
53 twin conductor wire to power supply
54 electric power supply

DETAILED DESCRIPTION OF FIRST EMBODIMENT

FIG. 1 shows an overview of the present invention as it is installed in a typical vanity cabinet. Threadably inserted into the cold water supply line is a shutoff valve 2. Referring to FIG. 2A, shutoff valve 2 is comprised of a valve body 20, which provides a flow through passage, and a sliding plunger 24, which slides longitudinally through the valve body and passes directly through the flow through passage at a perpendicular angle.

The diameter of plunger 24 is larger than the diameter of the flow through passage, such that, the plunger may be inserted into the valve body so as to completely block the flow through passage. A central portion of plunger 24 is cut to have a narrower diameter than the rest of the plunger, such that, when the plunger is positioned with the narrow portion in the center of the valve body, a path is provided in which water may flow.

Plunger 24 is fixed with a compression spring 26, and an end cap 28, giving the valve 2 a spring return to the normal open position. A water tight joint is made with gasket seals 25a and 25b. Attached to valve body 20 is slotted cable support bracket 21. Bracket 21 holds outer cable jacket 10b. Cable end ball 10c is held by slotted hook bracket 22. Bracket 22 is attached to plunger 24 with screw 23. The slots in bracket 21 and 22 allow cable assembly 10 to be "snap fit" to the valve assembly, that is, the cable can be attached or detached from the valve assembly without the use of tools.

FIG. 2B shows the shutoff valve 2 in the unactuated, normally open position. The narrow diameter portion of plunger 24 is centered in the flow through passage of valve body 20, providing a path for water flow. FIG. 2C shows cable 10 acting on the shutoff valve 2, moving it into the closed, actuated position. The plunger has moved so that its full diameter is centered in the flow though passage, thereby blocking water flow.

Shutoff valve 2' is inserted into the hot water line, and is identical to shutoff valve 2 inserted into the cold line. Cable 11 is attached to shutoff valve 2' in an identical manner as cable 10 is attached to shutoff valve 2.

FIG. 3 shows a cable junction box assembly 3, which includes a rigid frame 30. Frame 30 provides a support for the outer cable jackets 10b, and 11b. Slotted cable support bracket 31 provides support for outer cable jacket 12b. Slotted hook bracket 32, which holds the cable end ball 12c, is attached to connecting rod 33. Connecting rod 33 is attached to cable joining member 34. Joining member 34 is attached to cable core 10a and 11a. This configuration allows for cable 12 to transfer it's pulling motion to cables 10 and 11. Also, the slots in bracket 31 and 32 allow cable assembly 12 to be attached without the use of tools, in the same manner as the shutoff valves receive their cable attachments.

Figure 4A:
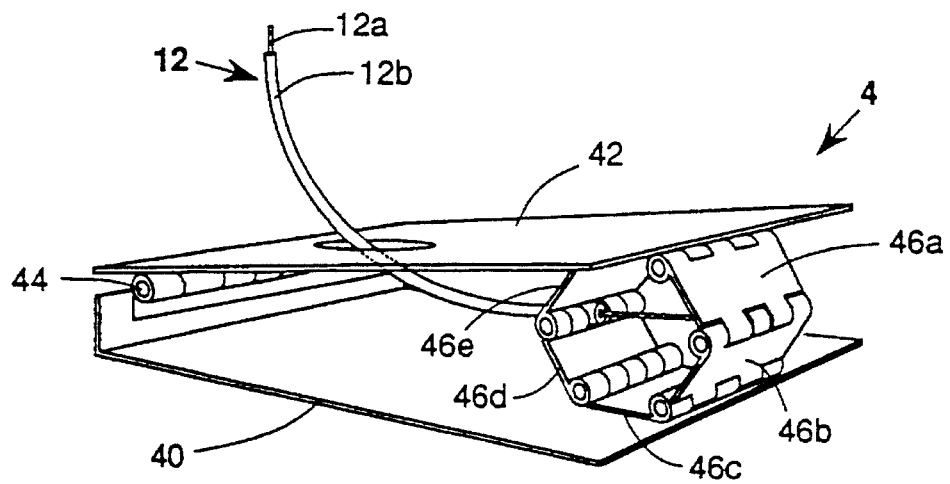
FIG. 4A is a perspective of the foot pedal assembly.
Figure 4B:
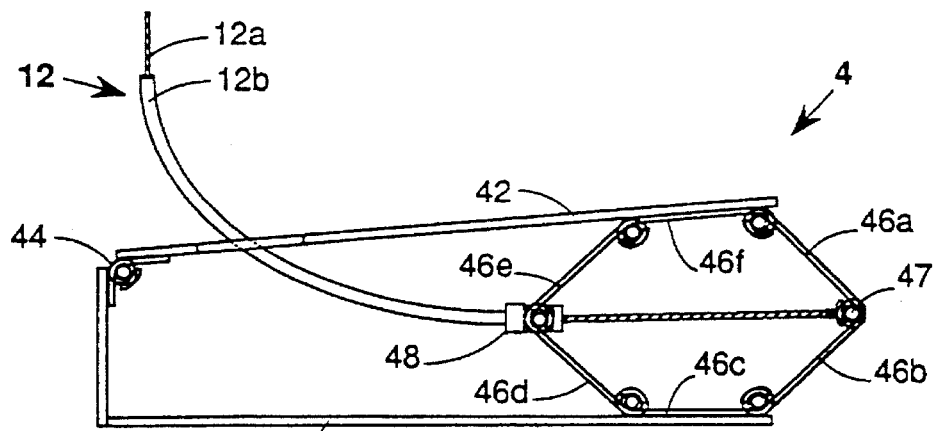
FIG. 4B is a side view of the foot pedal in the nominal position.

Referring to FIG. 4A, foot pedal 4 is comprised of a base plate 40, and a top pedal plate 42 which are joined at a hinge 44. Between base plate 40, and pedal plate 42 is a six-sided hinge assembly, comprised of hinge plates 46a through 46f as shown in FIG. 4B. Cable 12 passes through a clearance hole in pedal plate 42 and is joined to the hinge assembly. The outer jacket 12b of cable 12 is held by support sleeve 48, and the cable core 12a is attached to hinge pin 47.

Figure 4C:
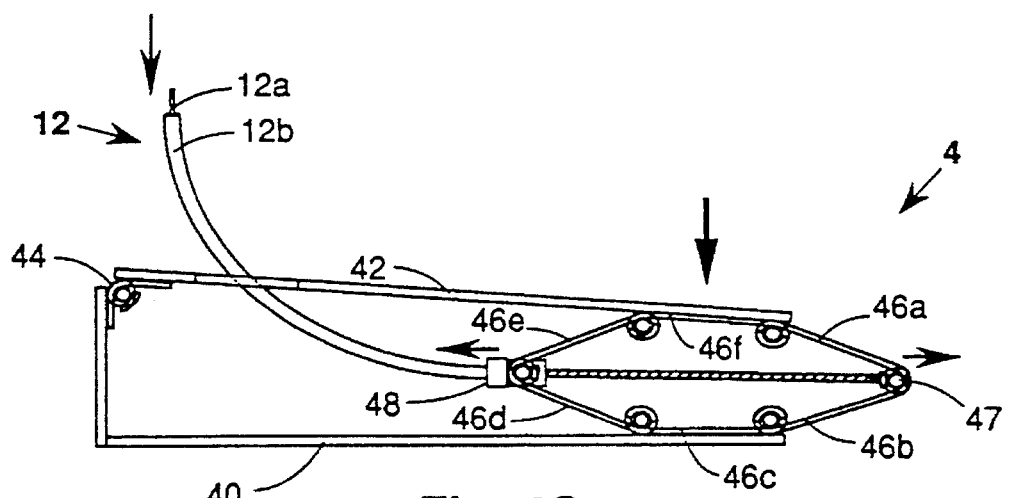
FIG. 4C is a side view of the foot pedal in the actuated position.

FIG. 4B shows the foot pedal in the nominal position; FIG. 4C shows the pedal in the actuated position. Depressing the foot pedal causes the six sided hinge to "flatten". The hinge points between plates 46a and 46b, and between 46d and 46e, are thus forced away from each other as a result of this "flattening", and it is this effect that is utilized to impart action on the cable. Cable core 12a is attached to hinge pin 47, and the cable jacket 12b is held by sleeve 48 such that the core 12a is drawn out of the jacket 12b as the pedal is depressed.

DETAILED DESCRIPTION OF SECOND EMBODIMENT

Figure 5:
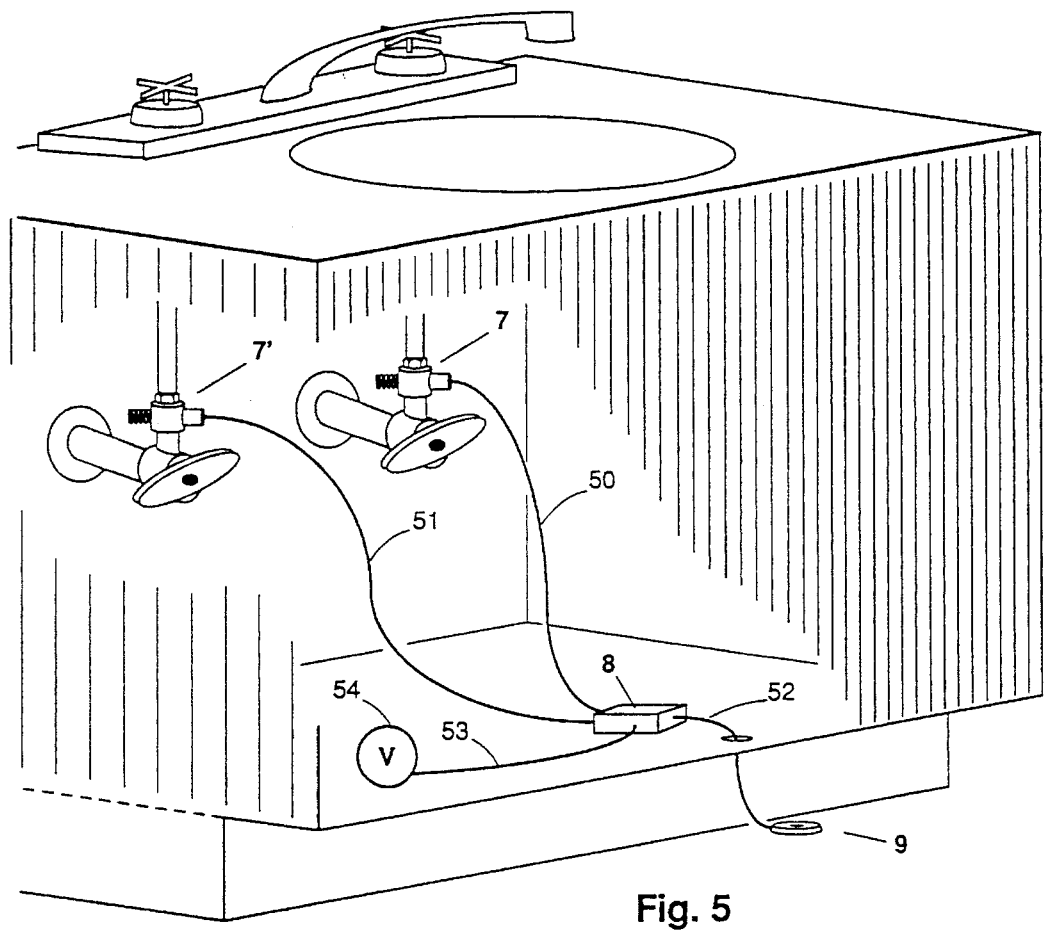
FIG. 5 is a perspective view showing the present invention implemented with solenoid valves and other electrical components.

FIG. 5 shows the current invention implemented with electric solenoid valves. Solenoid valves 7 and 7' are spring return, normally open, and are of the type that close when power is applied, and open when power is removed. Valve 7 is threadably installed in the cold water supply and is wired via electric cable 50 to junction box 8. Valve 7' is similarly installed in the hot water line and is wired via electric cable 51 to junction box 8. Cable 50, and cable 51 are twin conductors of a predetermined gauge compatible with the voltage and current requirements of the solenoid valves. Similarly, cable 52, and cable 53 are made of the same twin conductor material. Switch 9, which may be either momentary contact or latching, is a normally open, single pole, single throw switch. Switch 9 is connected via cable 52 to junction box 8. Cable 53 leads from junction box 8 to power source 54.

Figure 6:
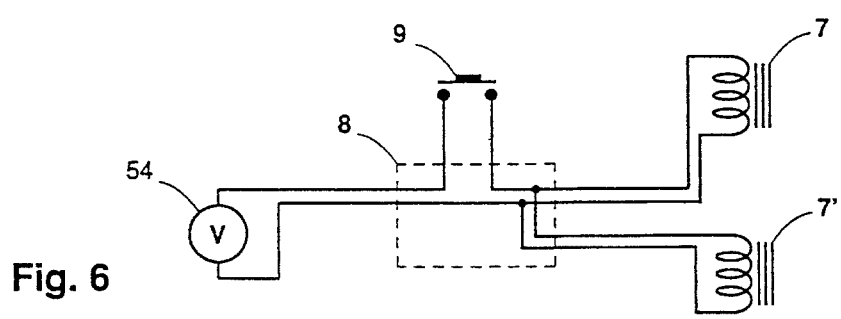
FIG. 6 is the wiring diagram for the electrical implementation.

FIG. 6 shows the wiring diagram for the system. The system includes a source of electric power 54, which may be any of: high voltage AC (110 to 220 volts), low voltage AC (6 to 24 volts), or low voltage DC (1.5 to 24 volts). All remaining electrical components: switch 9, solenoid valves 7 and 7', and the electrical cables 50, 51, 52, and 53 are selected to be compatible with the chosen source of power.

Solenoid valves 7 and 7' are wired together in parallel, and are then wired in series with switch 9 and power source 54. Closing switch 9 completes the circuit to both valves, causing them to close. Opening switch 9 breaks the circuit, causing both valves to open.

OPERATIONAL DESCRIPTION

Because the shutoff valves are normally in the open position, the valves do not interfere with the normal hand operation of the standard faucet fixtures. For example, if the water faucet is turned on by hand, the water flows through the faucet in the normal manner. The user can adjust the flow rate and the water to his or her liking in the normal fashion using the hand operated valves on the faucet. Then, in the case of the first embodiment, when the user wishes to temporarily stop the flow, he or she steps on the pedal 4. This actuates the six sided hinge assembly to pull the core 12a of the cable 12. This in turn pulls the cores 10a, 11a of the cables 10, 11 to the hot water valve 2' and the cold water valve 2. The sliding plunger 22 is thereby pulled into the valve body 20 shutting off the water. When the user wishes to restore flow, he or she releases the pressure on the pedal 4, thereby allowing the spring 24 to slide the sliding plunger 22 back to its rest position, unsealing the valve body 20. When the valves open, the water flow will resume at the same flow rate and temperature previously set by the user.

The case of the second embodiment differs from the first in that the mechanical implementation has been replaced with an electrical one. In this case too, the user adjusts the water temperature and flow in the normal fashion with the hand operated valves on the faucet. Then, when the user wants to stop the flow, they step on electric foot switch 9. This completes the circuit to the solenoid valves 7 and 7', both of which close and stop water flowing in cold and hot lines. When the user wishes to resume flow, they release switch 9 which breaks the circuit, allowing valves 7 and 7' to return to the open position.

The foot operated shutoff valve mechanism allows the user to temporarily shut off the water flow when it is not needed, thereby conserving water. Being foot operated, the mechanism can be easily actuated when the user's hands are otherwise occupied, such as while washing, shaving or brushing one's teeth. This added convenience encourages conservation in situations where it would not be convenient with standard hand-operated faucet fixtures.

Ramifications, and Scope of Invention

Those with normal skill in the art will recognize that such an "off" valve controlling mechanism could easily be realized by a number of alternate implementations.

The connection between the foot pedal and valves could be implemented as a pneumatic or hydraulic link.

As additional features, foot control might also be replaced or augmented by leg or knee actuation. Also, a latching configuration could be offered, that is, the device could be implemented so it could be latched in the "off" position, and then unlatched.

The current invention is derived from a contrary approach to existing foot operated dispensing apparatus. The scope of this invention includes all those implementations based on this approach, which are constructed from elements readily available in the known art, including mechanical, pneumatic, hydraulic, and electrical components.

Although the examples given include many specificities, they are intended as illustrative of only a few possible embodiments of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

What is claimed is:

1. A foot-operated water control valve, comprising:
    at least one valve means for controlling water flow through a water supply pipe, said valve means having an open position and a closed position,
    a biasing means for biasing said valve means toward said open position,
    a pedal having an on position and an off position,
    a means for connecting said pedal to said valve means such that, when a pressure is applied to said pedal to move said pedal from said on position to said off position, said valve means is urged from said open position to said closed position, and in the absence of a pressure on said pedal said biasing means urges said valve means from said closed position to said open position.

2. The foot-operated water control valve of claim 1 wherein said means for connecting said pedal to said valve means comprises a tension cable slidingly received within an outer jacket.

3. The foot-operated water control valve of claim 2 wherein said pedal comprises a base and a pedal plate and a cable actuation means, said pedal plate being pivotally attached to said base, said cable actuation means comprising a first member hingedly attached to said base, a second member hingedly attached to said first member and hingedly attached to said pedal plate, a third member hingedly attached to said base and a fourth member hingedly attached to said third member and hingedly attached to said pedal plate, means for attaching said outer jacket proximate the hinge point between said first member and said second member, and means for attaching said tension cable proximate the hinge point between said third member and said fourth member, such that when a pressure is applied to said pedal plate to urge said pedal plate toward said base, said first member pivots with respect to said second member and said third member pivots with respect to said fourth member, effectively moving the hinge point between said first member and said second member away from the hinge point between said third member and said fourth member, thereby applying a tension to said tension cable, said tension cable transmitting said tension to said valve means to urge said valve means from said open position to said closed position.

4. The foot-operated water control valve of claim 1 wherein said valve means comprises a spool valve having a spindle slidingly received within a cylindrical bore within a valve body, said valve body having an inlet and an outlet in fluid communication with said cylindrical bore, said spindle having a narrow region and a wide region, said narrow region having a cross sectional area less than the cross sectional area of said cylindrical bore, said wide region having a cross sectional area which substantially fills the cross sectional area of said cylindrical bore, said valve means being in said open position when said narrow region of said spindle is positioned between said inlet and said outlet, thereby providing a fluid path between said inlet and said outlet, said valve means being in said closed position when said wide region of said spindle is positioned between said inlet and said outlet, thereby interrupting the fluid path between said inlet and said outlet.

5. The foot-operated water control valve of claim 4 wherein said biasing means comprises a spring which urges said spindle to the position wherein said narrow region of said spindle is positioned between said inlet and said outlet, thereby providing a fluid path between said inlet and said outlet.

6. The foot-operated water control valve of claim 1 wherein said at least one valve means comprises a solenoid-operated valve, and said pedal comprises an electrical switch having an on position and an off position, said electrical switch being connected to a supply of electrical power, and said means for connecting comprises at least one electrical conductor connecting said solenoid-operated valve to said electrical switch, such that when said electrical switch is in said on position, electrical power is delivered to said solenoid-operated valve, thereby moving said solenoid-operated valve from said open position to said closed position, and when said electrical switch is in said off position, said biasing means urges said solenoid-operated valve from said closed position to said open position.

7. In combination:
    at least one water supply pipe,
    at least one hand-operated water valve for controlling water flow through said water supply pipe,
    at least one valve means for controlling water flow through said water supply pipe, said valve means being positioned in series with said hand-operated water valve, said valve means having an open position and a closed position,
    a biasing means for biasing said valve means toward said open position,
    a pedal having an on position and an off position,
    a means for connecting said pedal to said valve means such that, when a pressure is applied to said pedal to move said pedal from said on position to said off position, said valve means is urged from said open position to said closed position, and in the absence of a pressure to move said pedal from said on position to said off position, said biasing means urges said valve means from said closed position to said open position.

8. The combination of claim 7 wherein said means for connecting said pedal to said valve means comprises a tension cable slidingly received within an outer jacket.

9. The combination of claim 8 wherein said pedal comprises a base and a pedal plate and a cable actuation means, said pedal plate being pivotally attached to said base, said cable actuation means comprising a first member hingedly attached to said base, a second member hingedly attached to said first member and hingedly attached to said pedal plate, a third member hingedly attached to said base and a fourth member hingedly attached to said third member and hingedly attached to said pedal plate, means for attaching said outer jacket proximate the hinge point between said first member and said second member, and means for attaching said tension cable proximate the hinge point between said third member and said fourth member, such that when a pressure is applied to said pedal plate to urge said pedal plate toward said base, said first member pivots with respect to said second member and said third member pivots with respect to said fourth member, effectively moving the hinge point between said first member and said second member away from the hinge point between said third member and said fourth member, thereby applying a tension to said tension cable, said tension cable transmitting said tension to said valve means to urge said valve means from said open position to said closed position.

10. The combination of claim 7 wherein said valve means comprises a spool valve having a spindle slidingly received within a cylindrical bore within a valve body, said valve body having an inlet and an outlet in fluid communication with said cylindrical bore, said spindle having a narrow region and a wide region, said narrow region having a cross sectional area less than the cross sectional area of said cylindrical bore, said wide region having a cross sectional area which substantially fills the cross sectional area of said cylindrical bore, said valve means being in said open position when said narrow region of said spindle is positioned between said inlet and said outlet, thereby providing a fluid path between said inlet and said outlet, said valve means being in said closed position when said wide region of said spindle is positioned between said inlet and said outlet, thereby interrupting the fluid path between said inlet and said outlet.

11. The combination of claim 10 wherein said biasing means comprises a spring which urges said spindle to the position wherein said narrow region of said spindle is positioned between said inlet and said outlet, thereby providing a fluid path between said inlet and said outlet.

12. The combination of claim 7 wherein said at least one valve means comprises a solenoid-operated valve, and said pedal comprises an electrical switch having an on position and an off position, said electrical switch being connected to a supply of electrical power, and said means for connecting comprises at least one electrical conductor connecting said solenoid-operated valve to said electrical switch, such that when said electrical switch is in said on position, electrical power is delivered to said solenoid-operated valve, thereby moving said solenoid-operated valve from said open position to said closed position, and when said electrical switch is in said off position, said biasing means urges said solenoid-operated valve from said closed position to said open position.

13. In combination:
a hot water supply pipe,
    a hand-operated hot water valve for controlling water flow through said hot water supply pipe,
    a first valve means for controlling water flow through said hot water supply pipe, said first valve means being positioned in series with said hand-operated hot water valve, said first valve means having an open position and a closed position,
    a first biasing means for biasing said first valve means toward said open position,
a cold water supply pipe,
    a hand-operated cold water valve for controlling water flow through said cold water supply pipe,
    a second valve means for controlling water flow through said cold water supply pipe, said second valve means being positioned in series with said hand-operated cold water valve, said second valve means having an open position and a closed position,
    a second biasing means for biasing said second valve means toward said open position,
a pedal having an on position and an off position,
a means for connecting said pedal to said first valve means and said second valve means such that, when a pressure is applied to said pedal to move said pedal from said on position to said off position, said first valve means and said second valve means are urged from said open position to said closed position, and in the absence of a pressure to move said pedal from said on position to said off position, said first biasing means urges said first valve means from said closed position to said open position and said second biasing means urges said second valve means from said closed position to said open position.

14. The combination of claim 13 wherein said means for connecting said pedal to said first valve means and said second valve means comprises at least one tension cable slidingly received within an outer jacket.

15. The combination of claim 14 wherein said pedal comprises a base and a pedal plate and a cable actuation means, said pedal plate being pivotally attached to said base, said cable actuation means comprising a first member hingedly attached to said base, a second member hingedly attached to said first member and hingedly attached to said pedal plate, a third member hingedly attached to said base and a fourth member hingedly attached to said third member and hingedly attached to said pedal plate, means for attaching said outer jacket proximate the hinge point between said first member and said second member, and means for attaching said tension cable proximate the hinge point between said third member and said fourth member, such that when a pressure is applied to said pedal plate to urge said pedal plate toward said base, said first member pivots with respect to said second member and said third member pivots with respect to said fourth member, effectively moving the hinge point between said first member and said second member away from the hinge point between said third member and said fourth member, thereby applying a tension to said tension cable, said tension cable transmitting said tension to said valve means to urge said valve means from said open position to said closed position.

16. The combination of claim 13 wherein said first valve means and said second valve means each comprise a spool valve having a spindle slidingly received within a cylindrical bore within a valve body, said valve body having an inlet and an outlet in fluid communication with said cylindrical bore, said spindle having a narrow region and a wide region, said narrow region having a cross sectional area less than the cross sectional area of said cylindrical bore, said wide region having a cross sectional area which substantially fills the cross sectional area of said cylindrical bore, said valve means being in said open position when said narrow region of said spindle is positioned between said inlet and said outlet, thereby providing a fluid path between said inlet and said outlet, said valve means being in said closed position when said wide region of said spindle is positioned between said inlet and said outlet, thereby interrupting the fluid path between said inlet and said outlet.

17. The combination of claim 16 wherein said first valve means and said second valve means each comprise a spring which urges said spindle to the position wherein said narrow region of said spindle is positioned between said inlet and said outlet, thereby providing a fluid path between said inlet and said outlet.

18. The combination of claim 15 wherein said means for connecting said pedal to said first valve means and said second valve means comprises a first tension cable connected to said first valve means, a second tension cable connected to said second valve means, a third tension cable connected to said pedal, and a junction means for transmitting a tension which is applied to said third tension cable to said first tension cable and said second cable.

19. The combination of claim 13 wherein said first valve means comprises a first solenoid-operated valve, and said second valve means comprises a second solenoid-operated valve, and said pedal comprises an electrical switch having an on position and an off position, said electrical switch being connected to a supply of electrical power, and said means for connecting comprises a first electrical conductor connecting said first solenoid-operated valve to said electrical switch and a second electrical conductor connecting said second solenoid-operated valve to said electrical switch, such that when said electrical switch is in said on position, electrical power is delivered to said first and second solenoid-operated valves, thereby moving said first and second solenoid-operated valves from said open position to said closed position, and when said electrical switch is in said off position, said first biasing means urges said first solenoid-operated valve from said closed position to said open position and said second biasing means urges said second solenoid-operated valve from said closed position to said open position.

* * * * *